United States Patent
Gu et al.

(10) Patent No.: US 11,124,195 B1
(45) Date of Patent: Sep. 21, 2021

(54) SYSTEMS AND METHODS FOR RETRIEVING DRIVER SAFETY SCORES BY PASSENGER DEVICES

(71) Applicant: NORTONLIFELOCK INC., Tempe, AZ (US)

(72) Inventors: Lei Gu, Bedford, MA (US); Matt Boucher, Merrimack, NH (US)

(73) Assignee: NortonLifeLock Inc., Tempe, AZ (US)

( * ) Notice: Subject to any disclaimer, the term of this patent is extended or adjusted under 35 U.S.C. 154(b) by 0 days.

(21) Appl. No.: 17/081,703

(22) Filed: Oct. 27, 2020

(51) Int. Cl.
*B60W 40/09* (2012.01)
*G07C 5/00* (2006.01)
*G07C 5/08* (2006.01)

(52) U.S. Cl.
CPC ............. *B60W 40/09* (2013.01); *G07C 5/008* (2013.01); *G07C 5/0841* (2013.01); *B60W 2540/01* (2020.02); *B60W 2540/043* (2020.02)

(58) Field of Classification Search
CPC .......... B60W 40/09; B60W 2540/043; B60W 2540/01; G07C 5/0841; G07C 5/008
See application file for complete search history.

(56) References Cited

U.S. PATENT DOCUMENTS

| | | | | |
|---|---|---|---|---|
| 9,147,353 | B1* | 9/2015 | Slusar | G06Q 40/08 |
| 9,293,042 | B1* | 3/2016 | Wasserman | G08G 1/09 |
| 10,311,749 | B1* | 6/2019 | Kypri | G06Q 40/00 |
| 10,587,995 | B1* | 3/2020 | Dingli | H04W 4/40 |
| 10,640,082 | B1* | 5/2020 | Shannon | B60W 60/00253 |
| 10,697,784 | B1* | 6/2020 | Li | G06Q 10/025 |
| 2014/0113619 | A1* | 4/2014 | Tibbitts | B60W 40/09 455/419 |
| 2015/0210287 | A1* | 7/2015 | Penilla | G06F 3/04842 701/49 |
| 2015/0317844 | A1* | 11/2015 | Choi | G06F 16/2465 701/29.3 |
| 2016/0327397 | A1* | 11/2016 | Cordova | G06Q 40/08 |
| 2017/0255966 | A1* | 9/2017 | Khoury | H04L 67/20 |
| 2017/0369071 | A1* | 12/2017 | Gould | B60R 25/24 |
| 2018/0025430 | A1* | 1/2018 | Perl | G07C 5/008 705/4 |
| 2018/0052860 | A1* | 2/2018 | Hayes | G07B 15/02 |
| 2018/0061150 | A1* | 3/2018 | Harish | G01C 21/3697 |
| 2019/0019122 | A1* | 1/2019 | Allen | G06Q 50/30 |
| 2019/0039545 | A1* | 2/2019 | Kumar | H04L 67/18 |
| 2019/0303809 | A1* | 10/2019 | Karambatsos | G06Q 50/30 |
| 2020/0074492 | A1* | 3/2020 | Scholl | B60K 35/00 |
| 2020/0152067 | A1* | 5/2020 | Salles | G08G 1/20 |

(Continued)

*Primary Examiner* — Ryan W Sherwin
(74) *Attorney, Agent, or Firm* — FisherBroyles, LLP (57) ABSTRACT

A computer-implemented method for retrieving driver safety scores by passenger devices may include (i) determining that an operator of a mobile device is a passenger in a vehicle, (ii) gathering, via one or more sensors of the mobile device, identifying information about at least one of the vehicle and a current driver of the vehicle, (iii) identifying, based on the identifying information gathered by the one or more sensors of the mobile device, the current driver of the vehicle, (iv) retrieving a driver safety score for the current driver of the vehicle from a collection of driver safety scores, and (v) performing, by the mobile device, a security action in response to retrieving the driver safety score. Various other methods, systems, and computer-readable media are also disclosed.

20 Claims, 7 Drawing Sheets

(56) References Cited

U.S. PATENT DOCUMENTS

2020/0258138 A1* 8/2020 Ahmed ................ B60W 40/09
2020/0312063 A1* 10/2020 Balakrishnan ....... G07C 5/0816
2020/0317216 A1* 10/2020 Konrardy ............ B60W 30/182

* cited by examiner

SYSTEMS AND METHODS FOR RETRIEVING DRIVER SAFETY SCORES BY PASSENGER DEVICES

BACKGROUND

Parents often worry about the safety of their children, especially when their children first start driving as teenagers. Many applications exist to track children's location and monitor their driving habits. However, none of these applications provide any help when the child is riding as a passenger with a friend, who is likely to be an inexperienced driver and may be a poor or dangerous driver. This is understandably a cause of stress for parents, who have no direct source of information about the driving skills of their children's friends.

Teenagers giving each other rides isn't the only situation in which a passenger may be getting into a car with a potentially unsafe driver. With the growth of ride-sharing services, many adults get rides from complete strangers whose driving records are unknown. While ride-sharing apps often provide driver ratings, the pressure to always provide a perfect rating except in egregious circumstances can mean that a poor driver may still have a high rating.

Traditional systems for monitoring and rating the safety of a driver are hosted on the driver's device or in the car itself and do not provide data to passengers or passengers' adult guardians. The present disclosure, therefore, identifies and addresses a need for systems and methods for retrieving driver safety scores by passenger devices.

SUMMARY

As will be described in greater detail below, the instant disclosure generally relates to systems and methods for retrieving driver safety scores by passenger devices by uniquely identifying the driver and/or vehicle and retrieving a safety score for the driver based on data previously observed by other passenger devices.

In one example, a computer-implemented method for retrieving driver safety scores by passenger devices may include (i) determining that an operator of a mobile device is a passenger in a vehicle, (ii) gathering, via one or more sensors of the mobile device, identifying information about at least one of the vehicle and a current driver of the vehicle, (iii) identifying, based on the identifying information gathered by the one or more sensors of the mobile device, the current driver of the vehicle, (iv) retrieving a driver safety score for the current driver of the vehicle from a collection of driver safety scores in response to identifying the current driver of the vehicle in which the operator of the mobile device is the passenger, and (v) performing, by the mobile device, a security action in response to retrieving the driver safety score for the current driver of the vehicle in which the operator of the mobile device is the passenger.

In some examples, gathering the identifying information via the one or more sensors of the mobile device may include gathering audio information about the current driver via a microphone of the mobile device. In one example, gathering the identifying information via the one or more sensors of the mobile device may include gathering visual information about the vehicle via a camera of the mobile device. Additionally or alternatively, gathering the identifying information via the one or more sensors of the mobile device may include detecting, via a near field communication sensor of the mobile device, a near field communication identifier of a mobile device operated by the current driver of the vehicle. In some examples, gathering the identifying information via the one or more sensors of the mobile device may include receiving, by a transmission receiver of the mobile device, additional identifying information gathered by an additional device.

In one embodiment, identifying, based on the identifying information, the current driver of the vehicle may include matching the current driver with a stored driver profile based on the identifying information matching stored identifying information for the stored driver profile. In some examples, matching the current driver with the stored driver profile may include: (i) categorizing multiple types of identifying information, (ii) assigning a weight to each category of identifying information, and (iii) matching the current driver with a stored driver profile based on a weighted average of the identifying information.

In some examples, performing the security action may include transmitting the driver safety score to an additional device operated by a guardian of the operator of the mobile device. In one example, transmitting the driver safety score to the additional device may be in response to determining that the driver safety score is below a threshold for acceptable driver safety scores. Additionally or alternatively, performing the security action may include displaying the driver safety score on the mobile device.

In one embodiment, the computer-implemented method may further include monitoring driving behavior of the current driver while the operator of the mobile device is the passenger in the vehicle and transmitting the driving behavior of the current driver and an identifier of the current driver to a server that hosts the collection of driver safety scores. In some examples, the computer-implemented method may further include updating, by the server, the driver safety score based on the driving behavior monitored by the mobile device operated by the passenger.

In one embodiment, a system for implementing the above-described method may include at least one physical processor and physical memory comprising computer-executable instructions that, when executed by the physical processor, cause the physical processor to (i) determine that an operator of a mobile device is a passenger in a vehicle, (ii) gather, via one or more sensors of the mobile device, identifying information about at least one of the vehicle and a current driver of the vehicle, (iii) identify, based on the identifying information gathered by the one or more sensors of the mobile device, the current driver of the vehicle, (iv) retrieve a driver safety score for the current driver of the vehicle from a collection of driver safety scores in response to identifying the current driver of the vehicle in which the operator of the mobile device is the passenger, and (v) perform, by the mobile device, a security action in response to retrieving the driver safety score for the current driver of the vehicle in which the operator of the mobile device is the passenger.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) determine that an operator of a mobile device is a passenger in a vehicle, (ii) gather, via one or more sensors of the mobile device, identifying information about at least one of the vehicle and a current driver of the vehicle, (iii) identify, based on the identifying information gathered by the one or more sensors of the mobile device, the current driver of the vehicle, (iv) retrieve a driver safety score for the current driver of the vehicle from a collection of driver safety scores in response to identifying the current driver of the vehicle in which the operator of the mobile device is the passenger, and (v) perform, by the mobile device, a security action in response to retrieving the driver safety score for the current driver of the vehicle in which the operator of the mobile device is the passenger.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to systems and methods for retrieving driver safety scores by passenger devices. As will be explained in greater detail below, by using information about the driver and/or vehicle to identify the driver and retrieving a driver safety score calculated based on driving behavior recorded by previous passengers, the systems described herein may enable a passenger and/or passenger's guardian to determine whether an unknown driver is a safe driver.

In some embodiments, the systems described herein may improve the functioning of a computing device by enabling the computing device to collect and retrieve safety information about a driver who is not the operator of the computing device, improving the ability of the computing device to provide information that enables the operator to make safe travel choices. For example, the systems described herein may provide information that enables a passenger to avoid riding with unsafe drivers, reducing the passenger's risk of being involved in a vehicular accident.

Figure 1:
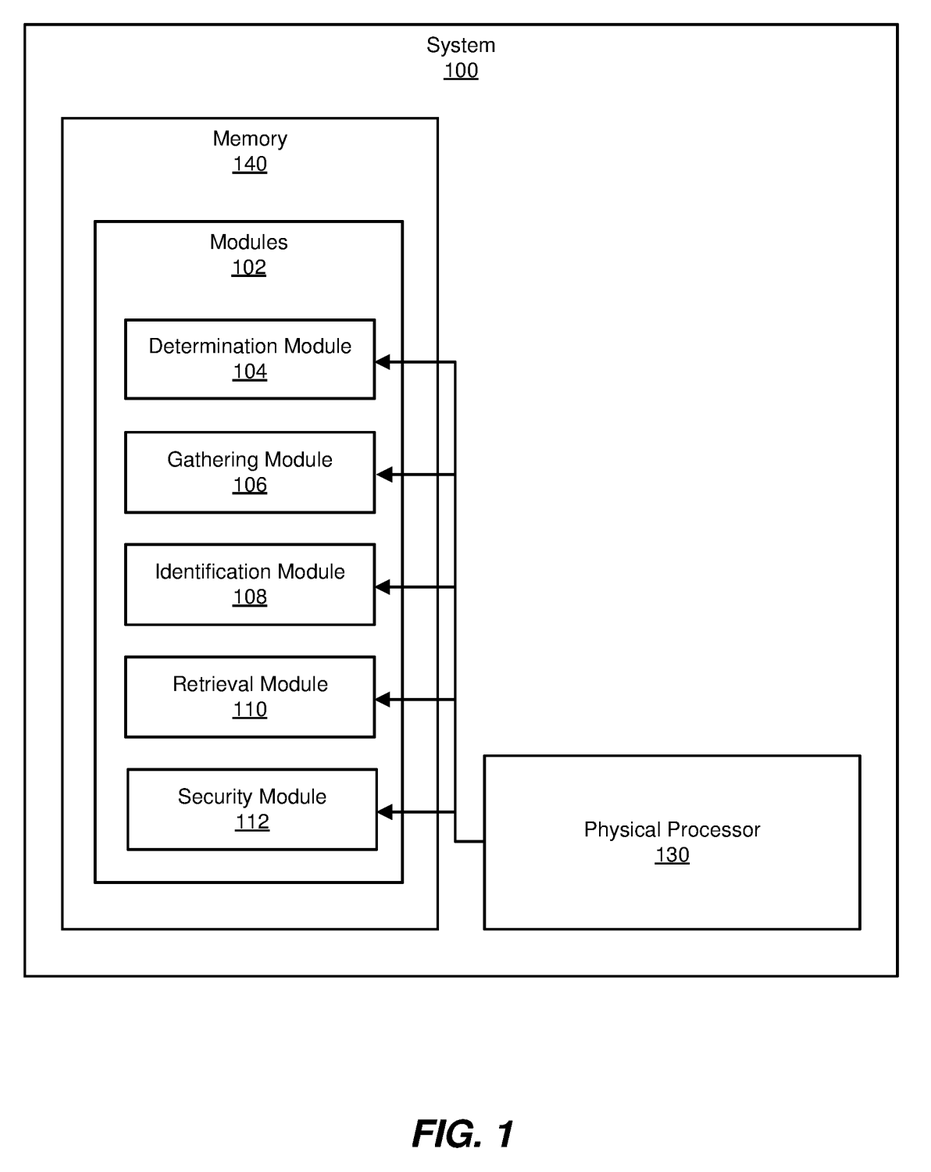
FIG. 1 is a block diagram of an exemplary system for retrieving driver safety scores by passenger devices.
Figure 2:
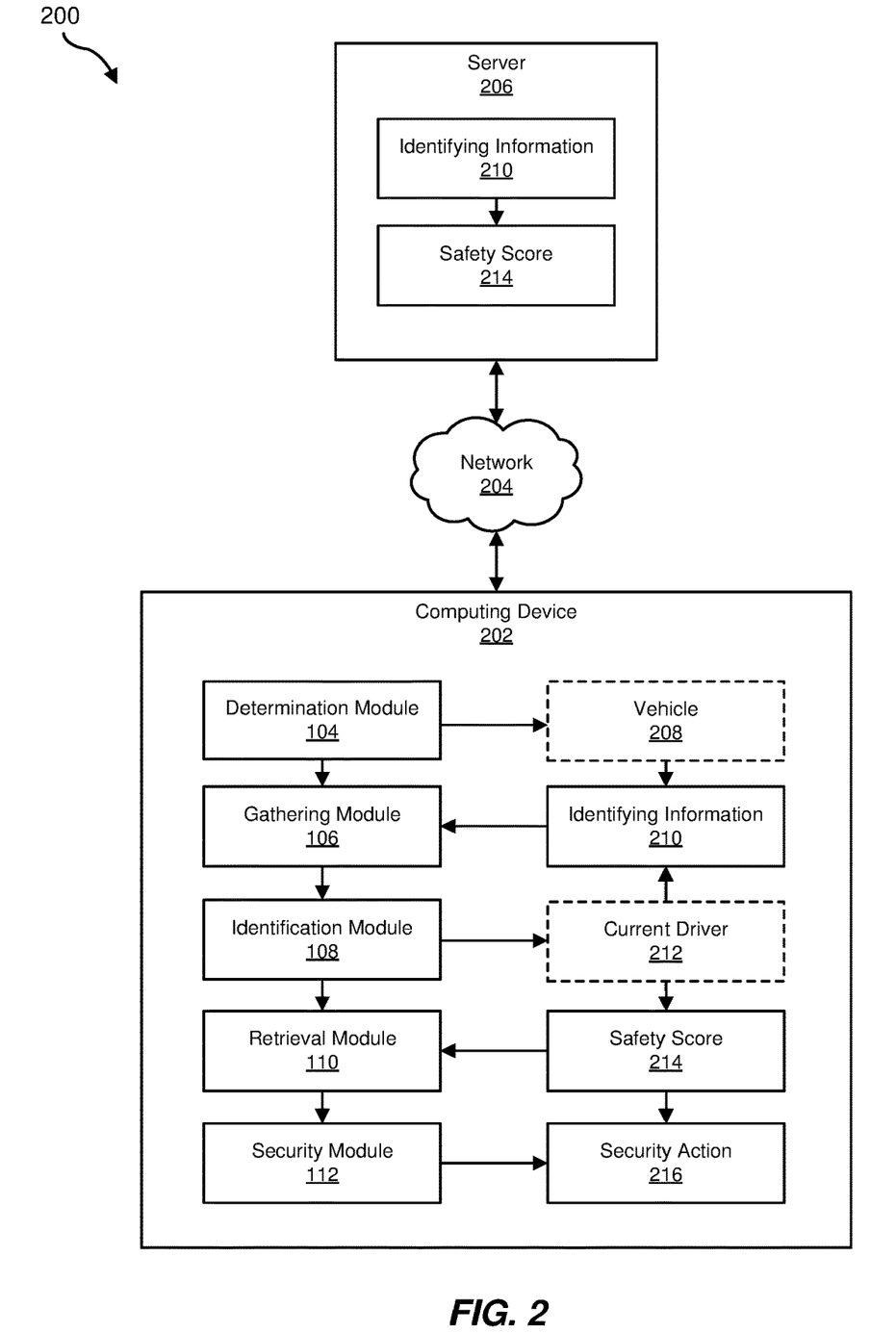
FIG. 2 is a block diagram of an additional exemplary system for retrieving driver safety scores by passenger devices.
Figure 4:
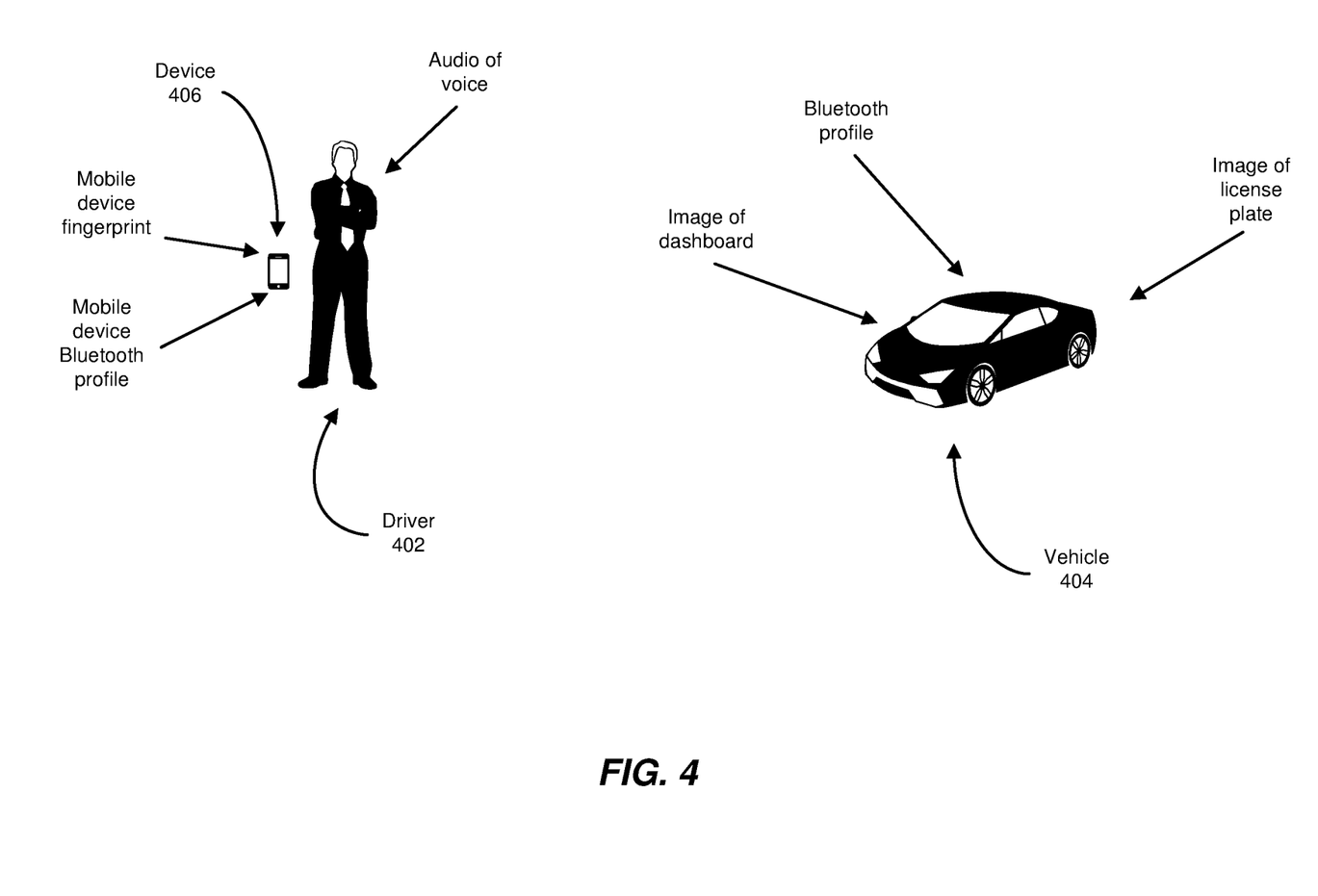
FIG. 4 is a diagram of an exemplary set of identifying information.
Figure 5:
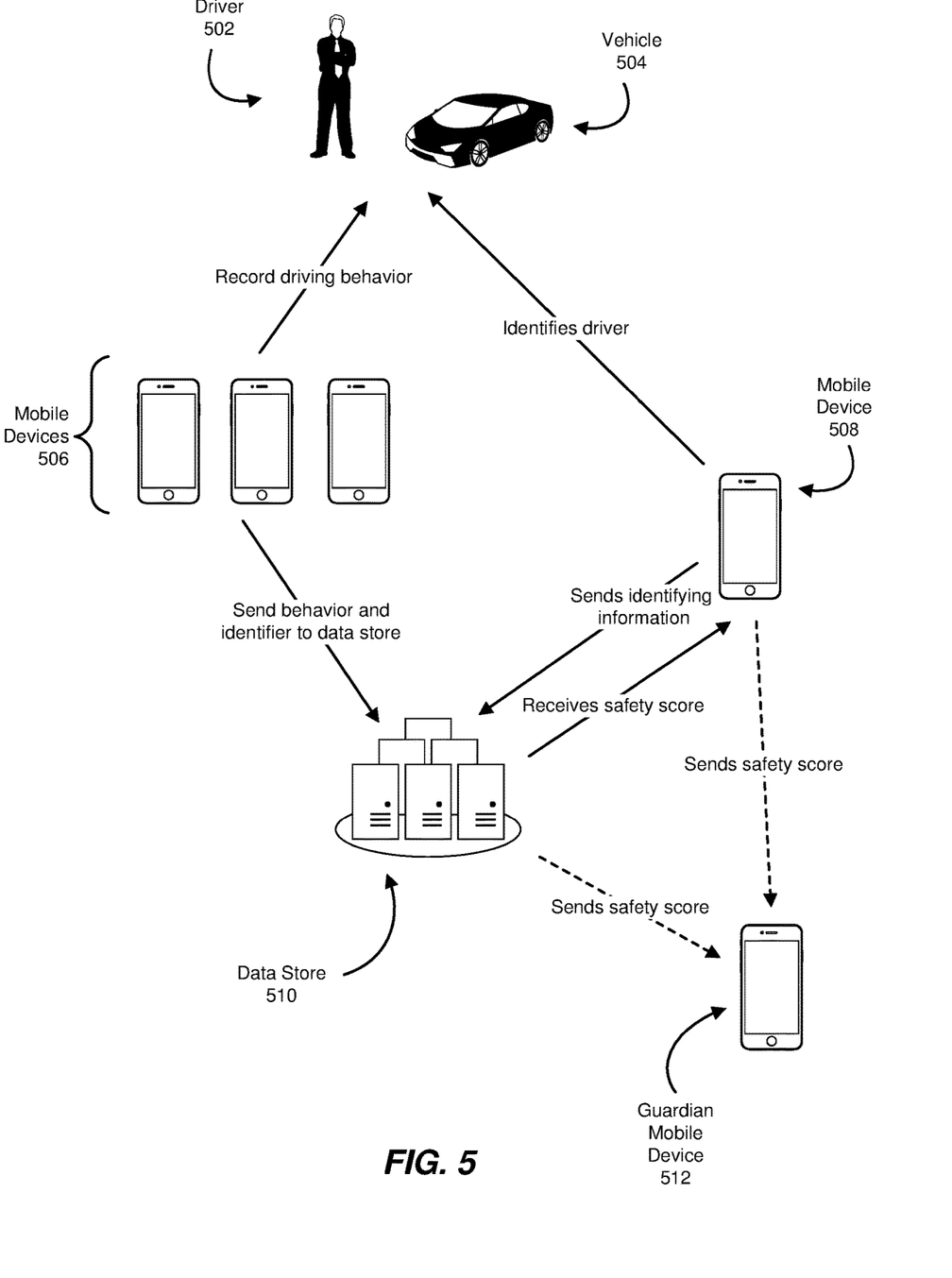
FIG. 5 is a diagram of an exemplary computing system for retrieving driver safety scores by passenger devices.

The following will provide, with reference to FIGS. 1, 2, and 5, detailed descriptions of exemplary systems for retrieving driver safety scores by passenger devices. Detailed descriptions of corresponding computer-implemented methods will also be provided in connection with FIG. 3. Detailed descriptions of example identifying information will be provided in connection with FIG. 4. In addition, detailed descriptions of an exemplary computing system and network architecture capable of implementing one or more of the embodiments described herein will be provided in connection with FIGS. 6 and 7, respectively.

FIG. 1 is a block diagram of example system 100 for retrieving driver safety scores by passenger devices. As illustrated in this figure, example system 100 may include one or more modules 102 for performing one or more tasks. For example, and as will be explained in greater detail below, example system 100 may include a determination module 104 that determines that an operator of a mobile device is a passenger in a vehicle. Example system 100 may additionally include a gathering module 106 that gathers, via one or more sensors of the mobile device, identifying information about the vehicle and/or the current driver of the vehicle. Example system 100 may also include an identification module 108 that identifies, based on the identifying information gathered by the one or more sensors of the mobile device, the current driver of the vehicle. Example system 100 may additionally include a retrieval module 110 that retrieves a driver safety score for the current driver of the vehicle from a collection of driver safety scores in response to identifying the current driver of the vehicle in which the operator of the mobile device is the passenger. Example system 100 may also include a security module 112 that performs, by the mobile device, a security action in response to retrieving the driver safety score for the current driver of the vehicle in which the operator of the mobile device is the passenger. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate retrieving driver safety scores by passenger devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, enable computing device 202 and/or server 206 to retrieve driver safety scores. For example, and as will be described in greater detail below, determination module 104 may determine that an operator of a mobile device (e.g., computing device 202) is a passenger in a vehicle 208. Next, gathering module 106 may gather, via one or more sensors of the mobile device, identifying information 210 about at least one of vehicle 208 and a current driver 212 of vehicle 208. In some examples, identification module 108 may identify, based on identifying information 210 gathered by the one or more sensors of the mobile device, current driver 212 of vehicle 208. After current driver 212 has been identified or concurrently with the identification of current driver 212, retrieval module 110 may retrieve a driver safety score 214 for current driver 212 of vehicle 208 from a collection of driver safety scores in response to identifying current driver 212 of vehicle 208 in which the operator of the mobile device is the passenger. In some cases, security module 112 may perform, by the mobile device, a security action 216 in response to retrieving driver safety score 214 for current driver 212 of vehicle 208 in which the operator of the mobile device is the passenger.

Computing device 202 generally represents any type or form of computing device capable of reading computer-executable instructions. In some embodiments, computing device 202 may be a mobile device, such as a smart phone. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of hosting a data store. In one embodiment, server 206 may be a server for a parental control application that monitors a child's mobile device. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
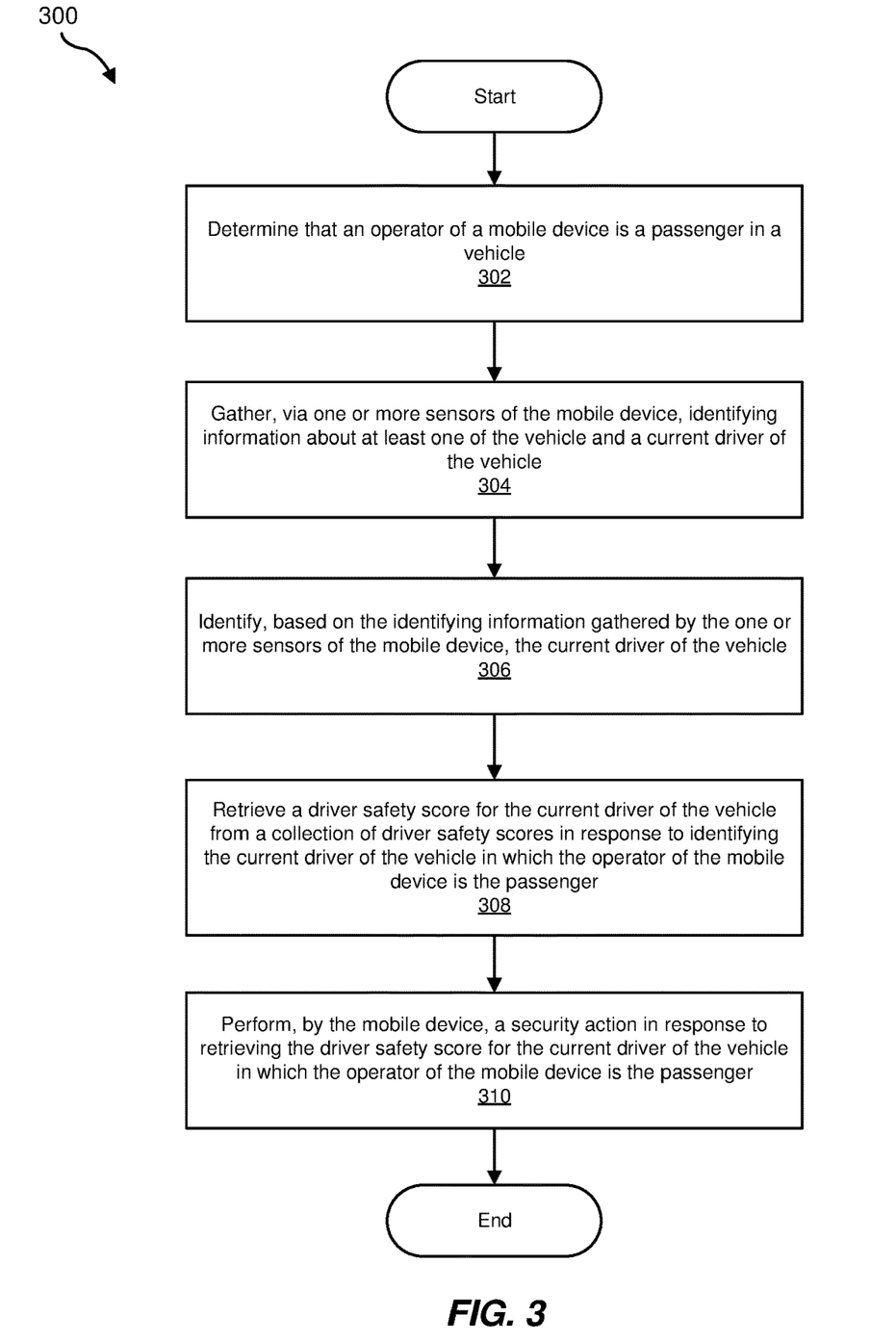
FIG. 3 is a flow diagram of an exemplary method for retrieving driver safety scores by passenger devices.

FIG. 3 is a flow diagram of an example computer-implemented method 300 for retrieving driver safety scores by passenger devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may determine that an operator of a mobile device is a passenger in a vehicle. For example, determination module 104 may, as part of computing device 202 in FIG. 2, determine that an operator of a mobile device is a passenger in vehicle 208.

The term "vehicle," as used herein, generally refers to any mode of motorized transportation capable of transporting an operator and one or more passengers. In some embodiments, a vehicle may be designed to enable the driver to have full control over the speed, direction, and other aspects of travel (as opposed to, e.g., a train, where the driver has limited control over the direction of travel). Examples of vehicles may include, without limitation, automobiles, trucks, buses, all-terrain vehicles, motorized scooters, and/or motorcycles.

The term "passenger," as used herein, generally refers to the state of being transported by a vehicle without operating the vehicle and/or being about to be transported by a vehicle without operating the vehicle. For example, a person riding in the passenger seat or back of a car is a passenger. In another example, a person who has called a ride via a ride-sharing application and is approaching the vehicle but is not yet within the vehicle is a passenger.

Determination module 104 may determine that an operator of a mobile device is a passenger of a vehicle in a variety of ways and/or contexts. For example, determination module 104 may receive input from the operator indicating that the operator is a passenger in a vehicle (e.g., the operator may open a driver safety score retrieval app). In another example, determination module 104 may detect that the operator has used a ride-sharing app on the mobile device to call a ride and is therefore a passenger in a vehicle. In one embodiment, determination module 104 may use an accelerometer of the mobile device to determine, based on the speed that the mobile device is moving, that the operator is likely a passenger in a vehicle. Additionally or alternatively, determination module 104 may detect a near field communication profile belonging to a vehicle and may determine, based on the relative positions of the mobile device and the vehicle, that the operator of the mobile device is a passenger in the vehicle.

In some embodiments, determination module 104 may determine whether the operator is a passenger or driver of the vehicle by analyzing the mobile device's orientation, position, and/or usage. For example, if the mobile device is perpendicular to the ground in landscape orientation with a navigation application open, the operator may be the driver of the vehicle. By contrast, if the mobile device is parallel to the ground in portrait orientation with a game application open, the operator is hopefully a passenger in the vehicle. In some examples, determination module 104 may have information indicating that the operator does not drive (e.g., because the operator is below the legal age to have a license, because the operator has set a preference indicating that the operator does not drive, etc.) and may therefore determine that any time the operator is in a vehicle, the operator is a passenger.

At step 304, one or more of the systems described herein may gather, via one or more sensors of the mobile device, identifying information about at least one of the vehicle and a current driver of the vehicle. For example, gathering module 106 may, as part of computing device 202 in FIG. 2, gather, via one or more sensors of the mobile device, identifying information 210 about at least one of vehicle 208 and current driver 212 of vehicle 208.

The phrase "identifying information," as used herein, generally refers to any information about a person and/or vehicle that may be used to differentiate that person and/or vehicle from a different person and/or vehicle. In some examples, identifying information may uniquely identify a person or vehicle, such as biometric information (e.g., a voice recording) or a license plate. In other examples, a single piece of identifying information may not uniquely identify a person or vehicle, such as a profile of a mobile device operated by a person or a make and/or model of a vehicle, but when combined with other pieces of identifying information, may uniquely identify the person and/or vehicle with a high degree of confidence. In some embodiments, the systems described herein may use identifying information about a vehicle to identify the driver of the vehicle (e.g., under the assumption that any given vehicle has a limited pool of individuals who drive the vehicle).

Gathering module 106 may gather identifying information in a variety of ways. For example, gathering module 106 may passively gather information from the mobile device's sensors without active input from the operator of the mobile device. In one example, gathering module 106 may record audio and/or scan for near field communication identifiers. Additionally or alternatively, gathering module 106 may gather information by receiving input from a user. For example, gathering module 106 may receive a picture of a license plate taken by a user using a camera of the mobile device.

Gathering module 106 may gather various types of identifying information about a driver and/or vehicle. FIG. 4 is an illustration of example types of identifying information. In one example, as illustrated in FIG. 4, gathering module 106 may gather audio information about a driver 402 via a microphone of the mobile device. For example, gathering module 106 may record a portion of a conversation between driver 402 and the operator of the mobile device. In some embodiments, gathering module 106 may gather the identifying information by detecting, via a near field communication sensor of the mobile device, a near field communication identifier of a mobile device 406 operated by driver 402, such as a BLUETOOTH profile. Additionally or alternatively, gathering module 106 may gather the identifying information by receiving, via a transmission receiver of the mobile device, additional identifying information gathered by an additional device. For example, a home wi-fi network may detect a mobile device fingerprint of device 406 when device 406 comes into range of the home wi-fi network. In this example, a device connected to the home wi-fi network (e.g., a device configured with an instance of the same parental control application of which gathering module 106 is part) may send the mobile device fingerprint to gathering module 106 either directly or via a server (e.g., a parental control application server).

In some embodiments, gathering module 106 may gather identifying information about a vehicle. For example, as illustrated in FIG. 4, gathering module 106 may gather the identifying by gathering visual information about the vehicle via a camera of the mobile device. In one example, gathering module 106 may receive an image of the license plate of a vehicle 404 via a camera of the mobile device. In another example, gathering module 106 may receive an image of the dashboard of vehicle 404. Additionally or alternatively, gathering module 106 may detect a near field communication identifier of vehicle 404. For example, gathering module 106 may detect a BLUETOOTH profile of vehicle 404.

Returning to FIG. 3, at step 306, one or more of the systems described herein may identify, based on the identifying information gathered by the one or more sensors of the mobile device, the current driver of the vehicle. For example, identification module 108 may, as part of computing device 202 in FIG. 2, identify, based on identifying information 210 gathered by one or more sensors of the mobile device, current driver 212 of vehicle 208.

Identification module 108 may identify the current driver based on the identifying information in a variety of ways. In one embodiment, identification module 108 may identify the current driver of the vehicle by matching the current driver with a stored driver profile based on the identifying information matching stored identifying information for the stored driver profile. For example, identification module 108 may include a list of drivers previously identified by the mobile device and may locate the driver in the list based on the identifying information. In some embodiments, identification module 108 may send the identifying information to a server that hosts a data store with a collection of driver profiles and identification module 108 may receive a response identifying the driver.

In some embodiments, the systems described herein may categorize multiple types of identifying information into categories, such as "vehicle information," "driver biometric information," "driver device information," and so forth. In one embodiment, the systems described herein may assign a weight to each category of identifying information and match the current driver with a stored driver profile based on a weighted average of the identifying information. For example, the systems described herein may weight driver-identifying information more highly than vehicle-identifying information because different drivers may drive the same vehicle and vice versa, meaning that information that uniquely identifies a vehicle may not uniquely identify a driver with the same level of confidence.

At step 308, one or more of the systems described herein may retrieve a driver safety score for the current driver of the vehicle from a collection of driver safety scores in response to identifying the current driver of the vehicle in which the operator of the mobile device is the passenger. For example, retrieval module 110 may, as part of computing device 202 in FIG. 2, retrieve driver safety score 214 for current driver 212 of vehicle 208 from a collection of driver safety scores in response to identifying current driver 212 of vehicle 208 in which the operator of the mobile device is the passenger.

The term "safety score," as used herein, generally refers to any representation of a driver's previous record for safe driving. In some embodiments, a safety score may include a numeric value and/or percentage. Additionally or alternatively, a safety score may include a labelled category, such as "very safe," "moderately safe," "moderately unsafe," and/or "very unsafe." In some embodiments, a safety score may include a confidence rating in the safety score. For example, a safety score based on one hour of monitored driving may have a lower confidence rating than a safety score based on one hundred hours of monitored driving.

Retrieval module 110 may retrieve the safety score in a variety of ways. For example, retrieval module 110 may retrieve a safety score stored within the mobile device. In another embodiment, retrieval module 110 may send a message to a server that hosts a collection of safety scores and may receive a response that includes the safety score. In some embodiments, the systems described herein may receive the safety score from a server in place of or concurrently with receiving a driver profile from the server in response to sending the identifying information to the server. For example, the systems described herein may send the identifying information to the server and may receive in response both the driver profile and the driver safety score.

At step 310, one or more of the systems described herein may perform, by the mobile device, a security action in response to retrieving the driver safety score for the current driver of the vehicle in which the operator of the mobile device is the passenger. For example, security module 112 may, as part of computing device 202 in FIG. 2, perform, by the mobile device, security action 216 in response to retrieving driver safety score 214 for current driver 212 of vehicle 208 in which the operator of the mobile device is the passenger.

Security module 112 may perform a variety of different security actions. For example, security module 112 may perform the security action by transmitting the driver safety score to an additional device operated by a guardian of the operator of the mobile device. In some embodiments, the systems described herein may be part of a parental control application configured to automatically send driver safety scores from the child's device to the guardian's device. In some examples, transmitting the driver safety score to the additional device may be in response to determining that the driver safety score is below a threshold for acceptable driver safety scores. For example, the parental control application may send an alert to the guardian's device if the driver is rated as unsafe.

Additionally or alternatively, security module 112 may perform the security action by displaying the driver safety score on the mobile device. In one embodiment, the systems described herein may be part of an application for users of ridesharing services who want information about a driver's level of safety beyond the information provided by the ridesharing app. In this embodiment, the systems described herein may display the driver safety score on the mobile device to enable the passenger to determine whether to get in the car with the driver or call a different car.

In some embodiments, the systems described herein may aggregate stored driver information collected by multiple mobile devices. For example, as illustrated in FIG. 5, the systems described herein may detect that the operator of a mobile device 508 is a passenger in a vehicle 504. Mobile device 508 may gather identifying information about vehicle 504 and/or a driver 502 of vehicle 504 and may send that identifying information to a data store 510. In some examples, data store 510 may have previously received driving behavior information and identifying information about driver 502 from mobile devices 506 (e.g., during previous trips that the operators of mobile devices 506 spent as passengers of driver 502). Data store 510 may then send a safety score for driver 502 to mobile device 508. In some examples, mobile device 508 and/or data store 510 may then send the safety score to a guardian device 512 operated by a guardian of the operator of mobile device 508.

In some embodiments, mobile device 508 may monitor the driving behavior of driver 502 while the operator of mobile device 508 is a passenger in vehicle 504 and may transmit the driving behavior and an identifier of driver 502 to data store 510 (e.g., by transmitting the data to a server that hosts data store 510). For example, mobile device 508 may monitor the speed, acceleration, deceleration, directional changes, and/or other driving behavior of driver 502. In some examples, data store 510 may update the driver safety score for driver 502 based on the driving behavior monitored by mobile device 508.

As explained above in connection with method 300 in FIG. 3, the systems and methods described herein may monitor a driver's behavior via a passenger's mobile device, create a safety score for the driver based on aggregated data from multiple mobile devices, and share the driver safety score with mobile devices belonging to passengers of the driver. In some examples, the systems described herein may share the driver safety score with an additional device, such as a device belonging to a guardian of a minor passenger. By making driver safety information available to passengers, the systems described herein may enable passengers and their guardians to make more informed choices about their safety.

Figure 6:
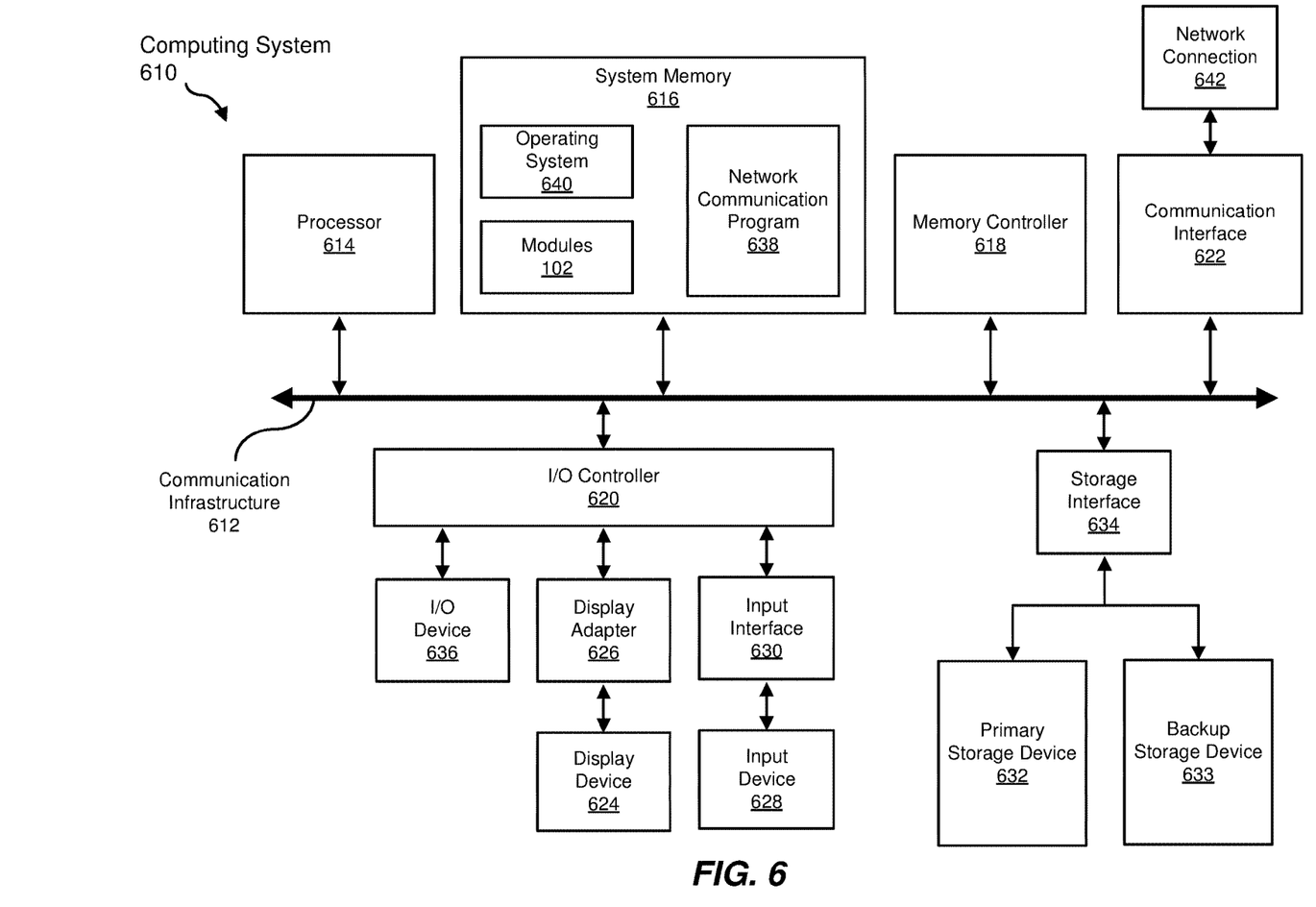
FIG. 6 is a block diagram of an exemplary computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
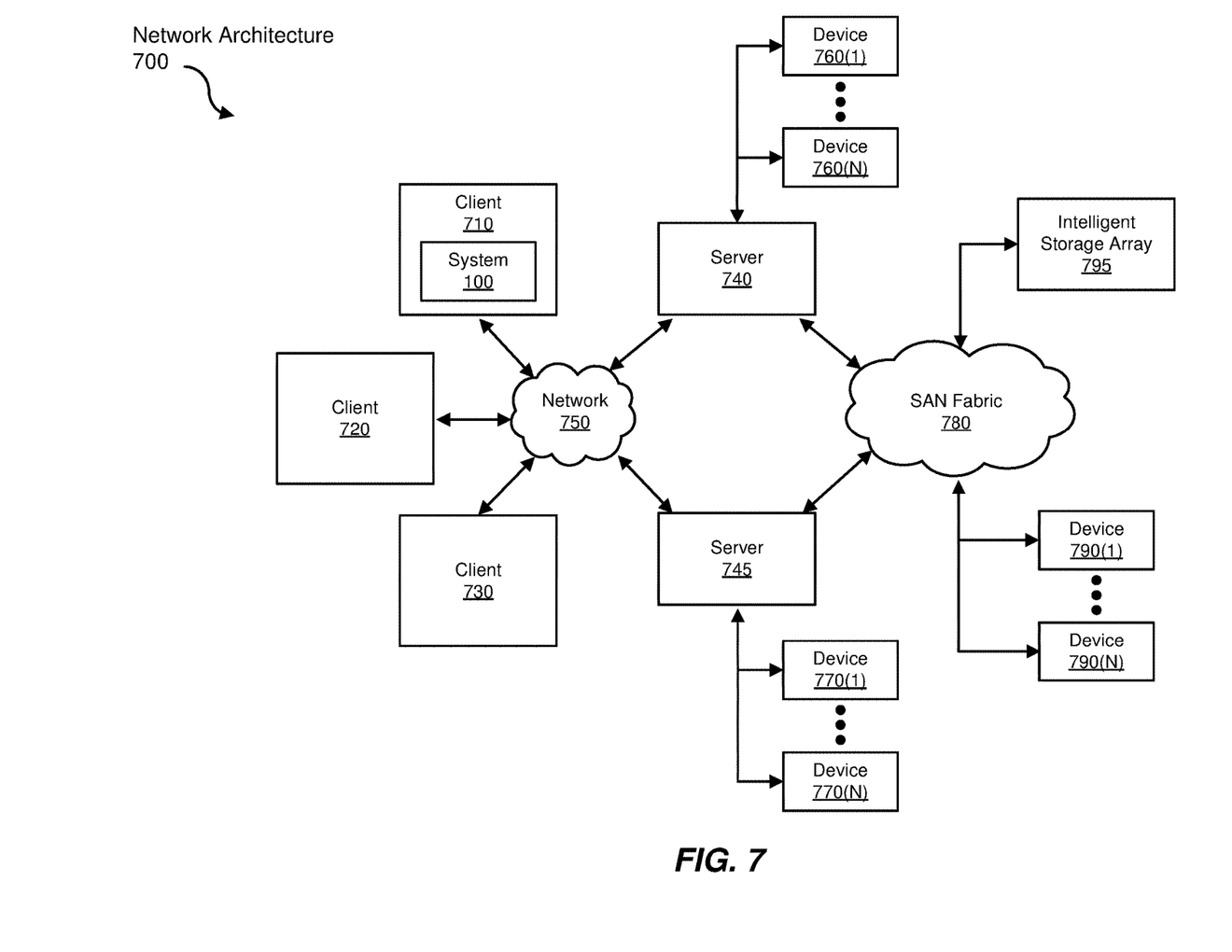
FIG. 7 is a block diagram of an exemplary computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for retrieving driver safety scores by passenger devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive data to be transformed, transform the data by correlating the data with a stored driver profile, output a result of the transformation to a data store lookup tool, use the result of the transformation to identify a driver profile, and store the result of the transformation to store additional data to the driver profile. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for retrieving driver safety scores by passenger devices, at least a portion of the method being performed by a computing device comprising at least one processor, the method comprising:
   determining that an operator of a mobile device is a passenger in a vehicle;
   gathering, via one or more sensors of the mobile device, identifying information about at least one of the vehicle and a current driver of the vehicle;
   identifying, based on the identifying information gathered by the one or more sensors of the mobile device, the current driver of the vehicle;
   retrieving a driver safety score for the current driver of the vehicle from a collection of driver safety scores in response to identifying the current driver of the vehicle in which the operator of the mobile device is the passenger; and
   performing, by the mobile device, a security action in response to retrieving the driver safety score for the current driver of the vehicle in which the operator of the mobile device is the passenger.

2. The computer-implemented method of claim 1, wherein gathering the identifying information via the one or more sensors of the mobile device comprises gathering audio information about the current driver via a microphone of the mobile device.

3. The computer-implemented method of claim 1, wherein gathering the identifying information via the one or more sensors of the mobile device comprises gathering visual information about the vehicle via a camera of the mobile device.

4. The computer-implemented method of claim 1, wherein gathering the identifying information via the one or more sensors of the mobile device comprises detecting, via a near field communication sensor of the mobile device, a near field communication identifier of a mobile device operated by the current driver of the vehicle.

5. The computer-implemented method of claim 1, wherein gathering the identifying information via the one or more sensors of the mobile device comprises receiving, by a transmission receiver of the mobile device, additional identifying information gathered by an additional device.

6. The computer-implemented method of claim 1, wherein identifying, based on the identifying information, the current driver of the vehicle comprises matching the current driver with a stored driver profile based on the identifying information matching stored identifying information for the stored driver profile.

7. The computer-implemented method of claim 6, wherein matching the current driver with the stored driver profile comprises:
   categorizing multiple types of identifying information;
   assigning a weight to each category of identifying information; and
   matching the current driver with a stored driver profile based on a weighted average of the identifying information.

8. The computer-implemented method of claim 1, wherein performing the security action comprises transmitting the driver safety score to an additional device operated by a guardian of the operator of the mobile device.

9. The computer-implemented method of claim 8, wherein transmitting the driver safety score to the additional device is in response to determining that the driver safety score is below a threshold for acceptable driver safety scores.

10. The computer-implemented method of claim 1, wherein performing the security action comprises displaying the driver safety score on the mobile device.

11. The computer-implemented method of claim 1, further comprising:
monitoring driving behavior of the current driver while the operator of the mobile device is the passenger in the vehicle; and
transmitting the driving behavior of the current driver and an identifier of the current driver to a server that hosts the collection of driver safety scores.

12. The computer-implemented method of claim 11, further comprising updating, by the server, the driver safety score based on the driving behavior monitored by the mobile device operated by the passenger.

13. A system for retrieving driver safety scores by passenger devices, the system comprising:
at least one physical processor;
physical memory comprising computer-executable instructions that, when executed by the physical processor, cause the physical processor to:
determine that an operator of a mobile device is a passenger in a vehicle;
gather, via one or more sensors of the mobile device, identifying information about at least one of the vehicle and a current driver of the vehicle;
identify, based on the identifying information gathered by the one or more sensors of the mobile device, the current driver of the vehicle;
retrieve a driver safety score for the current driver of the vehicle from a collection of driver safety scores in response to identifying the current driver of the vehicle in which the operator of the mobile device is the passenger; and
perform, by the mobile device, a security action in response to retrieving the driver safety score for the current driver of the vehicle in which the operator of the mobile device is the passenger.

14. The system of claim 13, wherein gathering the identifying information via the one or more sensors of the mobile device comprises gathering audio information about the current driver via a microphone of the mobile device.

15. The system of claim 13, wherein gathering the identifying information via the one or more sensors of the mobile device comprises gathering visual information about the vehicle via a camera of the mobile device.

16. The system of claim 13, wherein gathering the identifying information via the one or more sensors of the mobile device comprises detecting, via a near field communication sensor of the mobile device, a near field communication identifier of a mobile device operated by the current driver of the vehicle.

17. The system of claim 13, wherein gathering the identifying information via the one or more sensors of the mobile device comprises receiving, by a transmission receiver of the mobile device, additional identifying information gathered by an additional device.

18. The system of claim 13, wherein identifying, based on the identifying information, the current driver of the vehicle comprises matching the current driver with a stored driver profile based on the identifying information matching stored identifying information for the stored driver profile.

19. The system of claim 18, matching the current driver with the stored driver profile comprises:
categorizing multiple types of identifying information;
assigning a weight to each category of identifying information; and
matching the current driver with a stored driver profile based on a weighted average of the identifying information.

20. A non-transitory computer-readable medium comprising one or more computer-executable instructions that, when executed by at least one processor of a computing device, cause the computing device to:
determine that an operator of a mobile device is a passenger in a vehicle;
gather, via one or more sensors of the mobile device, identifying information about at least one of the vehicle and a current driver of the vehicle;
identify, based on the identifying information gathered by the one or more sensors of the mobile device, the current driver of the vehicle;
retrieve a driver safety score for the current driver of the vehicle from a collection of driver safety scores in response to identifying the current driver of the vehicle in which the operator of the mobile device is the passenger; and
perform, by the mobile device, a security action in response to retrieving the driver safety score for the current driver of the vehicle in which the operator of the mobile device is the passenger.

* * * * *